J. G. CALLAN.
GOVERNING MECHANISM FOR ELASTIC FLUID TURBINES.
APPLICATION FILED APR. 24, 1908.
980,487.
Patented Jan. 3, 1911.
4 SHEETS—SHEET 1.
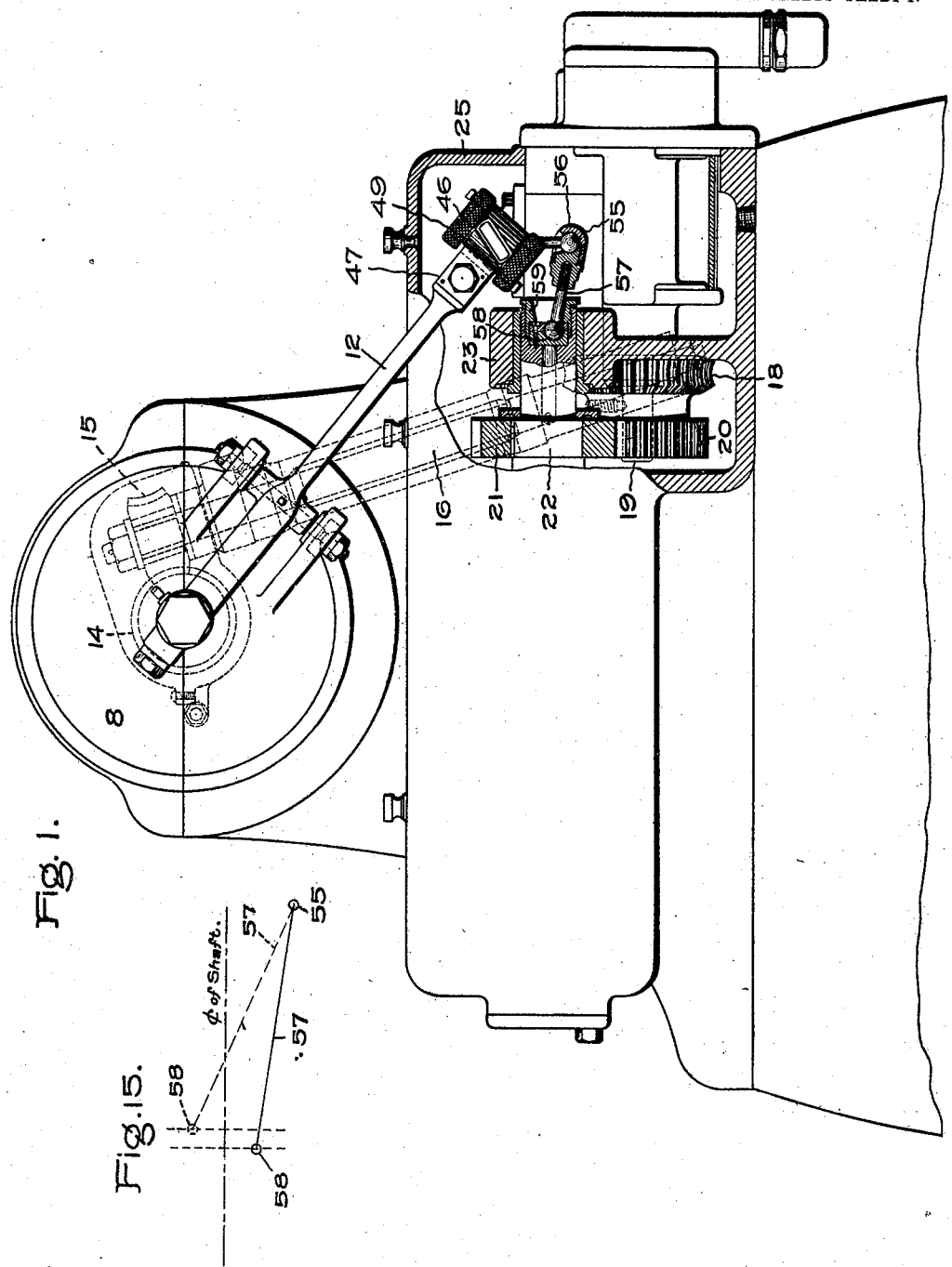
Witnesses:
Marcus L. Byng
J. Ellis Glen
Inventor,
John G. Callan,
By Albert G. Davis
Att'y

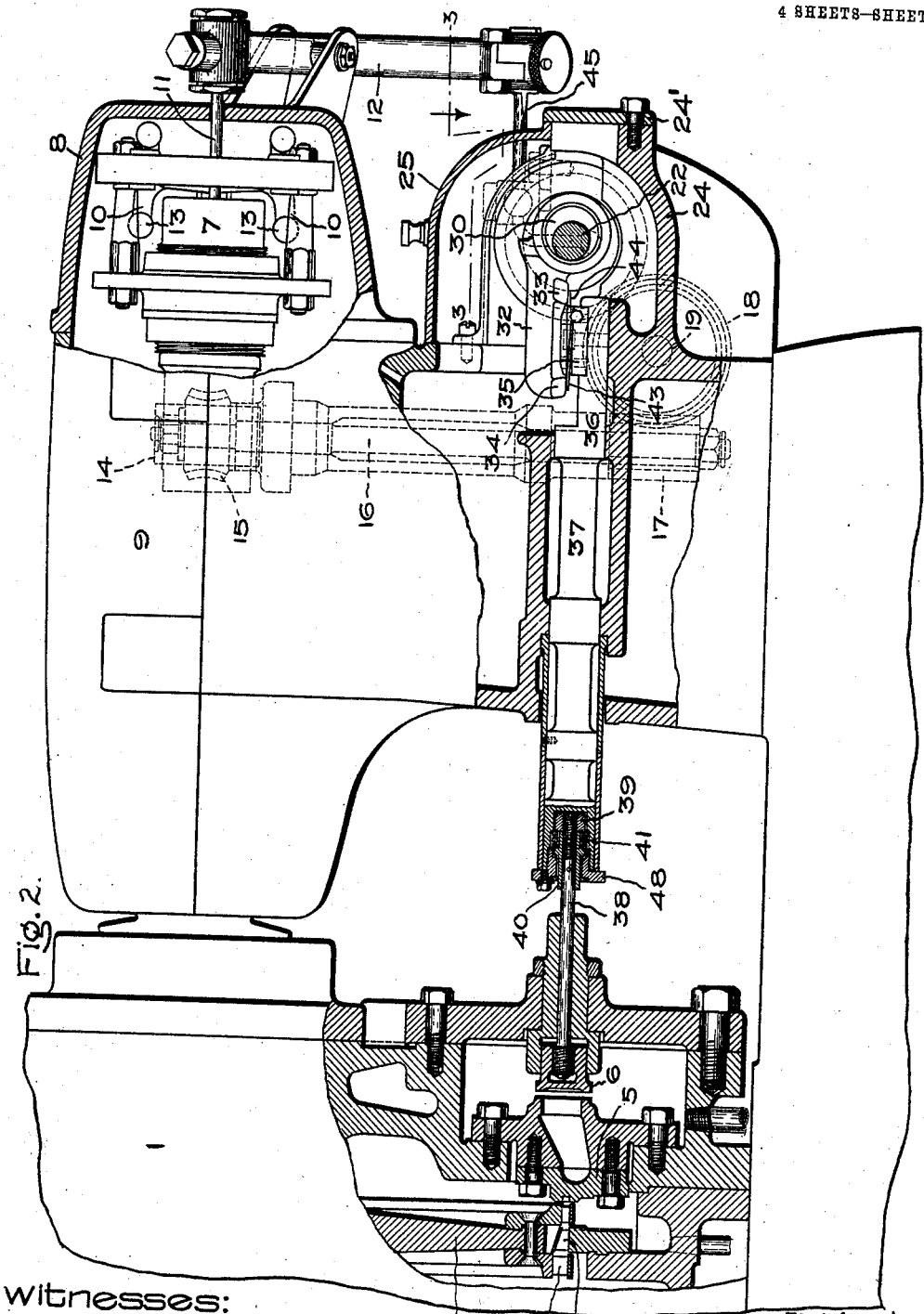

J. G. CALLAN.
GOVERNING MECHANISM FOR ELASTIC FLUID TURBINES.
APPLICATION FILED APR. 24, 1908.
980,487.
Patented Jan. 3, 1911.
4 SHEETS—SHEET 3.
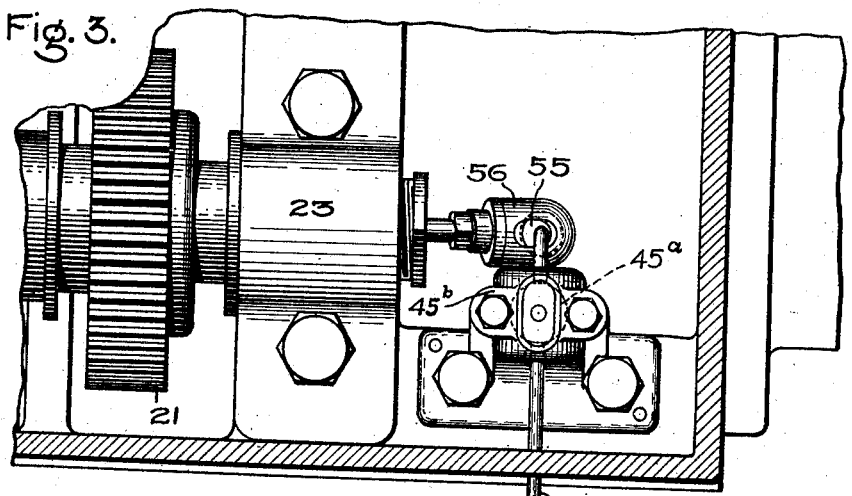
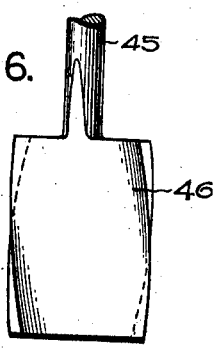
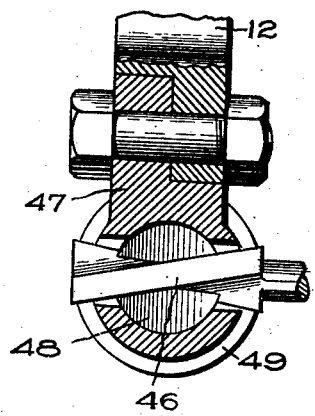
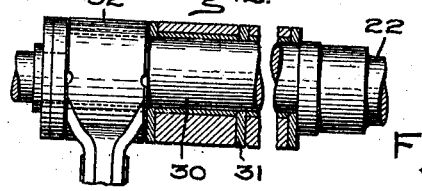
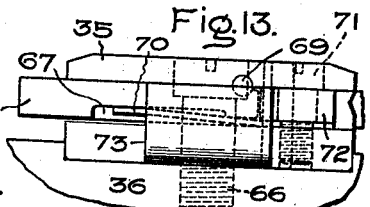
Witnesses:
Inventor,
John G. Callan,
By
Att'y.

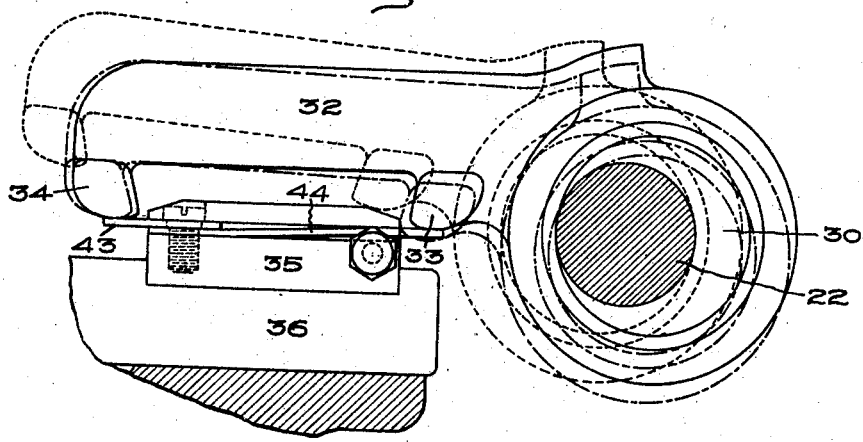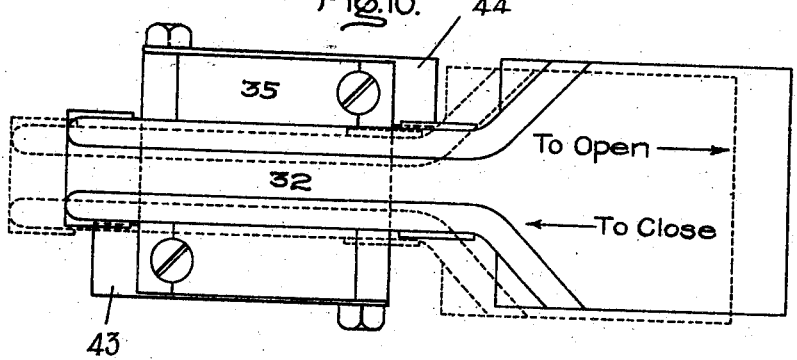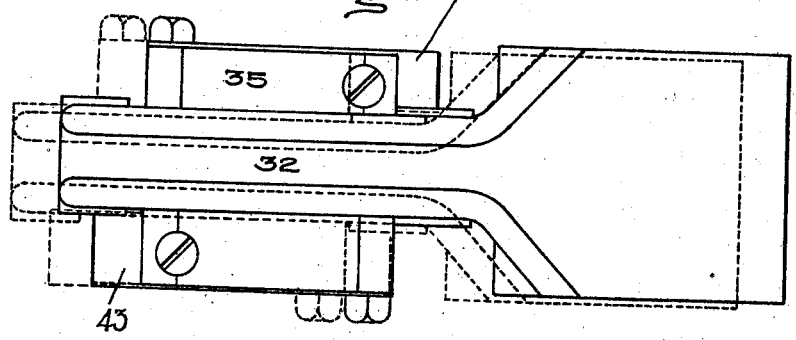

UNITED STATES PATENT OFFICE.

JOHN G. CALLAN, OF NAHANT, MASSACHUSETTS, ASSIGNOR TO GENERAL ELECTRIC COMPANY, A CORPORATION OF NEW YORK.

GOVERNING MECHANISM FOR ELASTIC-FLUID TURBINES.

980,487.  Specification of Letters Patent.  Patented Jan. 3, 1911.

Application filed April 24, 1908. Serial No. 428,937.

To all whom it may concern:

Be it known that I, JOHN G. CALLAN, a citizen of the United States, residing at Nahant, county of Essex, State of Massachusetts, have invented certain new and useful Improvements in Governing Mechanism for Elastic-Fluid Turbines, of which the following is a specification.

The present invention relates to the type of governing mechanism of my Patent 845,292, dated Feb. 26, 1907, and has for its object to improve the construction in certain details as will appear hereinafter.

In the accompanying drawings which are illustrations of my invention, Figure 1 is an end view of a part of a turbine with a portion of the casing inclosing the valve operating mechanism broken away; Fig. 2 is a side elevation of the same with the casing broken away to show the working parts of the apparatus; Fig. 3 is a detail view of the means for imparting an endwise motion to the shaft and eccentrics which actuate the valve moving dogs; Figs. 4 to 8 inclusive are details of the means employed to transmit motion from the governor to the shaft and the eccentrics; Fig. 9 is a view in side elevation of one of the dogs and of the valve actuating block coöperating therewith; Figs. 10 and 11 are plan views of the dogs, the dotted lines indicating the extent of movement of the dogs due to the action of the vibrating mechanism; Fig. 12 is a detail view of the shaft and eccentrics; Fig. 13 is a detail view of an improved form of valve actuating block; Fig. 14 is a detail view of the shaft and eccentric showing the key for securing a collar between the dogs, and Fig. 15 is a diagram illustrating the action of the device for vibrating the valve actuating shaft, eccentric and dogs.

In Fig. 2, 1 indicates the casing of the turbine and 2 a bucket wheel therefor, having one, two or more rows of wheel buckets 3. Between each two rows of wheel buckets is a more or less complete row of intermediate buckets 4. Steam is admitted to the buckets by a nozzle 5 comprising a plurality of sections or passages which are under the control of the valves or regulators 6. I may, however, use my improved apparatus for actuating other forms of regulators. The bucket wheel is mounted upon a suitable shaft and on the right hand end of the shaft is a centrifugal governor 7, inclosed by a housing 8 attached to the pillow block 9 that supports one of the main bearings. The governor comprises weights carried by the arms 10 and a suitable opposing spring. The resultant motion of the weights and spring is transmitted by the rod 11 to the governor lever 12. When the speed increases, the weights 13 move outwardly and the rod 11 is moved to the left. A decrease in speed moves the rod to the right.

Mounted on the main shaft of the turbine is a worm 14, shown in dotted lines, Fig. 2, which meshes with the worm wheel 15, the latter being mounted upon a shaft 16. On the lower end of the shaft is a skew gear 17 that meshes with a gear 18, mounted upon a stub shaft 19. Mounted upon the same shaft, Fig. 1, is a gear 20 which meshes with a gear 21 on the valve actuating shaft 22, whereby the latter is rotated at a definite speed relation with respect to the main shaft. The shaft 22 may be rotated at any suitable speed, by preference at a speed considerably lower than that of the main shaft of the turbine. The valve actuating shaft 22 is mounted in bearings 23 located at the ends therefor, only one of these bearings being shown, the other being covered by the casing. The shape of this casing is best shown in Fig. 2 wherein 24 is an extension of the pillow block containing oil to lubricate the revolving parts. Mounted on the extension and bolted thereto is a flat plate 24'. 25 is a cover which when removed, exposes the dogs and the other parts of the operating mechanism.

The construction of the shaft 22 is best shown in Fig. 12. It is provided with two end portions of reduced size, which fit into and are supported by the bearings 23. Between the ends is an eccentric 30 which is formed integral therewith. By making the shaft and eccentric in this way the parts will be stiff and hence will not bend when the valves are actuated by the dogs. Mounted upon the eccentric are collars 31, the peripheral surfaces of which are concentric with the shaft axis. It will be understood that the eccentric is made in one piece and is common to all of the valve actuating dogs. In so far as the principle is concerned it may be considered as being composed of as many eccentrics as there are dogs and valves to be actuated, the collars being located between them. Between these collars are mounted dogs 32 which positively open and close the valves in response to load changes. The shaft 22 is constantly rotated at a suitably low speed and the dogs 32 are constantly moved to and fro by the eccentric 30.

It will be helpful to an understanding of this invention if it be borne in mind that the valve actuating shaft and eccentric or eccentrics are constantly rotating at a speed determined by the main shaft, and that all of the dogs are constantly moving to and fro in the direction of their length. Under normal conditions some of the dogs will have opened their valves while others will be moving back and forth without affecting the positions of the remaining valves. One dog, which may be said to be at the critical point in the regulation, may be opening and closing its valve on each stroke, or it may only do so on a change in speed. When it is necessary to increase or decrease the steam supply to satisfy the load requirements, the governor shifts the actuating shaft, the eccentric and the dogs thereon. The parts are so related that this action first affects the valve at the critical point in the regulation and thereafter a valve at one side or the other thereof, depending on whether more or less steam is to be admitted. For ordinary load changes the valves are operated successively, but for abnormal changes two or even more valves may be operated by their dogs simultaneously.

Referring to Fig. 9, the construction of the dogs will be described: 22 indicates the valve actuating shaft and 30 the eccentric formed thereon. Each dog 32 is provided with a heel 33 and a toe 34 which project below the under side thereof. Situated directly under the dog is a block 35 carried by one end of the sliding cross head 36. This cross head is attached to a valve 6 as best shown in Fig. 2. The cross head is provided with one or more guides, and the portion underneath the block is flat to prevent it from turning. To the cross head is attached a rod 37 which is suitably guided by the pillow block. This rod may be an integral part of the cross head or it may be separate therefrom, as desired. The end of the rod is bored to receive the valve stem 38, the latter being provided with a nut 39 and a fixed sleeve 40 having a collar thereon. Between the nut and collar is a coiled compression spring 41 that compensates for any contraction and expansion of the parts and for any minor inaccuracy in the machine work. The end of the rod 37 is threaded internally, to receive the nut 48 which is shouldered to receive the collar on the sleeve 40 and assist in opening the valve.

The dogs are constantly reciprocating due to the action of the eccentric 30, and since it is necessary to prevent them from actuating the valves except under certain stated conditions, each block 35 is provided with a pair of landing springs 43 and 44 the former being arranged to receive the toe of the dog and the latter the heel. These landing springs are made of relatively thin flat metal and are supported at one end only, and are free to yield in a downward direction when struck by the dogs. The space between these springs is such that when a dog is in the central or neutral position, it will have no effect on the valve, but when moved either side of this position due to the governor moving the valve actuating shaft it will drop to its active position and open or close its valve as the case may be. When a dog is so shifted that the landing spring 43 is out of line with it, the toe 34 will drop into engagement with the left hand side of the block and pull it and the cross head 36 to the right. One revolution of the eccentric is sufficient to fully open or to fully close a valve. When the landing spring 44 is out of line with the heel 33, the latter is permitted to drop into engagement with the right hand face of the block 35, and close the valve on the left hand motion of the dog by a pushing action.

It is evident with such a construction that if the valves are to be operated successively, the dogs being held against independent sidewise motion on the eccentric, the actuating shaft must be moved axially by successive steps in order to successively cause the dogs to engage or be disengaged from the blocks. This is accomplished by means of the governor through the rod 11, Fig. 2, lever 12 and oscillating L-shaped member 45 connected to the lower end thereof. This member is connected at one end by a ball and socket connection 56, Fig. 1, to the end of the valve and eccentric actuating shaft 22. The other end of the member is provided with a means for turning or oscillating it about its horizontal axis as the governor lever 12 moves to and fro. It is to be noted that the said member is held against longitudinal movement by the spherical enlargement 45$^a$ shown in dotted lines Fig. 3, but is capable of being turned or oscillated in the bearing 45$^b$ by the action of the speed governor and coöperating parts. Hence, as the speed of the turbine changes, due to changes in load, the governor will move the shaft 22, the eccentric 30 and the dogs carried thereby in one direction or the other, depending on whether the speed increases or decreases. It will be noted that the plane of movement of the governor actuated lever 12 does not coincide with the plane in which the eccentric must be moved to cause the dogs to actuate the valve.

In order to transmit the necessary motion from the governor lever, a novel arrangement of parts is provided. Formed integral with the member 45 is an element 46 that is substantially rectangular in cross section, and forms a part of a screw or spiral of very coarse pitch which extends through a part carried by the governor lever 12, which part forms in effect a nut to be described later on. Since the member 45 is held against longitudinal movement by the spherical enlargement 45ª, but is free to turn on its horizontal axis it follows that as the nut is moved to and fro by the governor lever that said member will be given a turning or oscillating movement about said axis.

In the present illustration the element 46 if prolonged would make a complete turn in twelve inches. The width of said element is about one and one-half inches. The width and thickness are immaterial so long as ample bearing surfaces are provided. The pitch of the screw or spiral should be such that the governor lever 12 as it moves about its pivot can impart an oscillatory movement to the rod 45 and an axial movement to the shaft. On the other hand the pitch should be such that the shaft 22 or any other part operated thereby cannot freely move the parts of the governor or affect the position of its parts. What is sought in the design of this spiral is to make the efficiency of transmission of power from the governor to the eccentric as high as possible, say 90% for example, while that of the transmission of power from the eccentric to the governor is low as 15 to 25% for example. In other words, the connection between the governor lever and the eccentric contains a lock which permits the former to move the latter, but which prevents the free transmission of movement from the eccentric to the governor. It will thus be seen that the locking means is not absolutely irreversible since it may, and in fact should, yield a little under certain conditions. If the lock did not yield slightly the heels and toes of the dogs would be moved on the side faces of blocks at the same time that they are actuating them; this would cause heavy strains and serious wear.

The spiral element 46 passes through a holder 47 that is attached to the lower end of the governor lever 12 by a bolt. This holder is bored centrally and is slotted on opposite sides to receive said element as shown in Fig. 5. As the holder moves in the arc of a circle it is necessary to so arrange the parts that this action can take place. This is accomplished by providing a two-part nut 48 that snugly fits the bore of the holder, the parts of which are suitably slotted to receive the sides of the member 46. These parts are held against outward movement by the screw-threaded caps 49 and are kept at a fixed distance apart by said member but are free to turn to compensate for the angular movement of the governor lever 12 about its axis. Small screws are employed to lock the caps in place.

In some cases, as for example, when the turbine is directly connected to an electric generator of the constant potential type and the regulation has to be exceedingly close, I provide a novel means for eliminating the effects of backlash, increasing the sensitiveness of governing and overcoming the static friction of the parts, which friction tends to make the action of the governor mechanism as a whole a little sluggish. To carry out this feature of my invention the member 45 is made L shaped, and on the end away from the governor lever is provided with a ball 55, Figs. 1 and 3, that is seated in a coupling 56. To the coupling is attached a rod 57 having a ball 58 on its free end which is seated in a spherical bearing that is carried by one end of the shaft 22 and held in place by the nut 59. The center of the ball 58 is eccentrically disposed to the axis of the shaft as is also that of ball 55. The ball 55 is normally fixed in position by the governor for any given load condition and acts as a pivot for the rod 57, the ball 58 of which revolves with the shaft in an elliptical path. So long as there is no change in speed of the turbine the ball 55 cannot move and as the shaft can it does so, forward and then back, one complete stroke for each revolution. In other words, the rod 57 with its ball 58 travel in the path of a cone, the apex of which is the center of the ball 55. Owing to the fact that the center of the ball 58 is eccentric to the axis of the shaft and that the ball 55 is fixed below said axis, it follows that as the shaft rotates to a position of 180° from that shown, it will have been gradually moved to the right, Fig. 15, and that as the ball moves from said position to the one shown, it will be gradually moved a limited amount to the left, or in other words is returned to its initial position. This motion while very slight is sufficient to keep the parts "alive" so to speak and prevent them from sticking when it becomes necessary for them to operate. As the load conditions change the position of the ball 55 changes and so also does the region of reciprocation or vibration of the shaft 22 and its eccentric or eccentrics and dogs. In Figs. 10 and 11, the dotted lines show the effect of the vibrating device just referred to on the dogs. The full lines represent their normal positions for a given speed condition and the dotted lines the amount they are moved due to the action of the vibrating device.

It is to be noted that once a valve is moved to a given position, its dog must be moved sidewise by the eccentric by the amount of the "lap" before the other end of said dog will engage and move the valve to its other position. "Lap" may be defined as the amount by which one part, as the toe for example, laps or extends over its corresponding landing spring when the heel is just at the edge of its landing spring. This lap has to be made a fairly substantial amount or the parts will quickly wear out, due to the landing of the dog on too small a surface.

The sensitiveness of the mechanism will be a function of the conditions above defined, since, given a certain governing setting, a definite speed change is required to move the dog sidewise by the amount of the lap and thus to close the valve once it is opened, or conversely. So when the turbine is governing on a certain valve, the speed will necessarily "hunt" up and down by the amount thus defined, the valve meanwhile being alternately opened and closed. It is necessary to make this amount of "hunt" on a given load smaller than a certain fixed amount, and the constants of the design permit of this, provided there is no friction or backlash in the parts. As a matter of fact, there is almost no friction and what little there is is overcome by the means previously described and illustrated diagrammatically in Fig. 15.

Considering the question of backlash, there are, from governor weights to the working edge of a dog, a number of moving parts which require working clearance, and the aggregate amount of these clearances is sufficient to cause sluggishness in regulation, i. e., the governor has to move more than it should which in turn means that the speed must change more than it ought in order to close the valve once it is open, or conversely. The primary result of the action of the vibrating device dealt with herein is to eliminate the effect of this backlash. Referring to Fig. 10 it will be seen that once the valve is open, the dog starts back on its return travel and if no governor action takes place misses connection with the rear edge of the block on account of the fact that the front edge or toe of the dog is riding upon landing spring 43. If, on the contrary, the opening of the valve has resulted in considerably accelerating the turbine, the governor will move the dog sidewise in a direction tending to release engagement with the landing spring 43 and establish engagement with the landing spring 44. The vibrating device is intended to so function that when the governor starts to do this, it will not have to first traverse the amount of the aggregate backlash, but will on the contrary, start moving the dog to the desired position just as soon as its own weights begin to move. It will be noted from Fig. 10 that at the end of the backward excursion of the dog, all the backlash is taken up one way, and in such direction that if the governor endeavors to move the dog in the direction to take it off of spring 43 it will encounter no loose play in the joints. This will be seen to be true on considering the fact that during its backward excursion the dog is being moved slightly in the direction in question by the vibrating device. It thus becomes clear that if the slight acceleration of turbine speed, due to the opening of the valve in question, is sufficient to legitimately move the dog off from spring 43 and cause it to engage with spring 44, then the valve will close and no lag will be introduced by presence of backlash or looseness in the parts. The length of the vibration stroke required to produce this result is equal in amount to the backlash so that, in so far as the statements in the last paragraph are concerned, the design could be such that the dog moves straight, forward and backward rather than "edging over," as shown in the drawing. On the other hand, the backlash must be taken up first one way and then the other which is accomplished by the reciprocating or vibratory action of the eccentric so that the parts will be prepared to respond instantly to a governor movement in any direction. That is to say, if a valve has just been opened, the action of the vibrating device must close up the backlash in such direction that the governor can promptly cause the valve to close if the opening produces too great acceleration of the turbine, and conversely.

Still a third effect is produced by making the amount of the vibration more than enough to exactly neutralize backlash. This third effect consists in reducing the "effective lap" without reducing the "actual lap" which latter determines the width of contact surface on the landing spring which comes into action when the dog lands. This effect is produced as follows:—Considering again the full lines of Fig. 10, if the position is such that the dog just misses spring 43 and lands on spring 44 with a width of landing surface equal to the lap then obviously the next forward motion will close the valve. This forward motion will have a further effect, provided the vibration is more than enough to counteract backlash. This further effect will be to edge the dog over toward the central position so that by the time the full forward traverse is performed a part of the lap is annulled, hence at the forward end of the stroke the governor has need only to move the dog sidewise by the remaining part of the lap in order to effect a reopening of the valve. This results in having a substantial surface on the landing spring, while at the same time the sensitiveness or amount by which the governor must move the dog to cause reversal of valve movement is as great as if the lap were reduced by the amount of the effective endwise vibration.

The advantages of the device for producing vibration are threefold. First, it eliminates the effect of backlash; second, it increases the sensitiveness of governing by giving virtual reduction of lap on the springs below the minimum width which mechanical considerations dictate; third, it eliminates any static friction in the joints by keeping these in slight motion all the time.

Referring to Fig. 12, the dogs 32 are mounted on the eccentric 30 and are separated by collars 31 which are secured in place by keys 65, Fig. 14. The peripheral surface of each collar is concentric with the axis of shaft 22. These collars in effect divide the eccentric into a number of short eccentrics each carrying a dog, and this without in any way weakening the structure as a whole. Actual experience has demonstrated that this arrangement is entirely satisfactory. Where the eccentric is made fairly long in order to support a greater number of dogs it may be supported at one or more points intermediate the bearings shown.

In Fig. 13 is shown an improved form of block which coöperates with a dog to move a valve. 36 indicates the cross-head which is attached to the valve. Mounted on top thereof and held by a screw 66 is a block 35. This block has horizontal slots 67 on opposite sides, only one being shown due to the nature of the illustration. In each slot is a pivotally supported landing device 68 for a dog, 69 being the pivot therefor. Underneath the device is a flat spring 70 tending at all times to hold the free end of the device in its raised position, the said spring taking the shock due to the hammer-like blow of the dog in descending. The right-hand end of the spring is secured by a screw 71 shown in dotted lines and a filling or spacing block 72. The landing devices are slipped into the slots from the sides, and to hold them in place a U-shaped holder 73 is provided that extends under the block and is held by the screw 66, the ends rising vertically and engaging said landing devices. These devices being separate can be hardened to any degree desired, as may also the toe and heel of each dog so as to reduce wear to a minimum. The springs being relatively large are easy to make and are not liable to be injured.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. In a governing mechanism, the combination of a regulator, a shaft, a dog for moving the regulator, means driven by the shaft for actuating the dog, a governor for determining the action of the dog on the regulator, and means for vibrating the dog.

2. In a governing mechanism, the combination of a regulator, a constantly moving shaft, a dog mounted thereon for opening and closing the regulator, a governor for moving the shaft and dog to control the action of the dog on the regulator, and a means for constantly vibrating the shaft and dog.

3. In a governing mechanism, the combination of a regulator, a constantly moving shaft, a dog mounted thereon for opening and closing the regulator, a cross-head attached to the regulator, a block carried by the cross-head, a governor for moving the dog sidewise to control its action on the block, and a means for constantly vibrating the dog in a sidewise direction.

4. In a governing mechanism, the combination of a regulator, a constantly moving shaft, a dog mounted on the shaft and reciprocated by it for actuating the regulator, a governor, a connection between the governor and shaft for moving the latter axially, and a means interposed in the connection which constantly vibrates the shaft irrespective of the position of the governor.

5. In a governing mechanism, the combination of a regulator, a constantly moving member, a dog moved by said member to and fro for opening or closing the regulator, a governor which shifts the region of movement of said dog in response to load changes, and a means that constantly vibrates the dog in a plane perpendicular to the motion imparted to it by said member, the said means shifting the region of its vibration in response to the action of the governor.

6. In a governing mechanism, the combination of a regulator, a shaft, means moved by the shaft for actuating the regulator, a speed governor that moves the shaft axially in response to speed changes, a connection between the shaft and governor, comprising a governing lever, a member actuated by the lever having a spherical end, a rod having a spherical end that is carried by the shaft, and a coupling that is attached to the rod and contains a seat for the spherical end of said member.

7. A turbine having a main shaft in combination with a secondary low-speed shaft, a driving connection between the two, a regulator, a means actuated by the secondary shaft for moving the regulator, a governor, a connection between the governor and shaft for moving the latter endwise, and a means for constantly vibrating the secondary shaft independently of the action of the governor.

8. A turbine having a main shaft in combination with a secondary low-speed shaft, a driving connection between the two, a regulator, a means actuated by the secondary shaft for moving the regulator, a governor, a lever attached thereto, a connection between the lever and the shaft for moving the latter endwise, and a means forming a part of the connection for constantly vibrating the shaft.

9. In a governing mechanism, the combination of a regulator, a means for actuating it, a shaft for moving said means, a governor, and a rod attached to the shaft at a point eccentric to its axis for moving it axially, which rod is also connected to and is moved by the governor.

10. In a governing mechanism, the combination of a regulator, a means for actuating it, a constantly rotating shaft, a rod attached to the shaft at a point eccentric to its center, a pivoted support for the opposite end of the rod that is also eccentric to said axis, and a connection between the support and the governor.

11. In a governing mechanism, the combination of a regulator, actuating means for opening and closing the regulator, a governor, a lever connected to the governor, a member connected at one end to the actuating means, and a locking device carried by the other end of said member and one end of the lever which permits the governor to freely act on said means but opposes the tendency of the latter to affect the position of the governor.

12. In a governing mechanism, the combination of a regulator, actuating means for opening and closing the regulator, and a connection between the governor and said means for transmitting motion from the former to the latter, said connection including two levers arranged at an angle to each other and a device connecting the adjacent ends of the levers which permits the governor to freely move said means but opposes the tendency of the latter to move the governor.

13. In a governing mechanism, the combination of a regulator, actuating mechanism for the regulator, a governor for controlling the action of said mechanism on the regulator, means connecting the governor and said mechanism which comprises a plurality of members, and a lock arranged in said connecting means which opposes the tendency of the actuating mechanism to alter the position of the governor, said lock including an element on one member having a spiral surface and a device on the next adjacent member of the connection coöperating therewith.

14. In a governing mechanism, the combination of a regulator, an actuating means therefor, a governor controlling the action thereof, and a lock which opposes the tendency of the means to alter the position of the governor, comprising a spiral element attached to one portion of the governing mechanism, a nut through which the element slides, and means for attaching the nut to another portion of the governing mechanism.

15. In a governing mechanism, the combination of a regulator, a shaft, means moved by the shaft for actuating the regulator, a speed governor that moves the shaft axially in response to speed changes, and a connection between the shaft and the governor, comprising a governor lever, a device carried thereby, and a spiral element that passes through said device and by means of which the governor moves the shaft.

16. In a governing mechanism, the combination of a regulator, a shaft, means moved by the shaft for actuating the regulator, a speed governor that moves the shaft axially in response to speed changes, a connection between the shaft and governor, comprising an L-shaped member having a spiral element at one end and a sphere at the other, a device moving with the governor and coöperating with the spiral for turning it, and a connection between the shaft and said sphere.

17. A turbine having a main shaft in combination with a secondary low-speed shaft, a driving connection between the two, a regulator, a means actuated by the secondary shaft for moving the regulator, a governor, a lever attached thereto, a connection between the lever and shaft for moving the latter endwise, and a lock included in said connection which opposes the tendency of the low-speed shaft to alter the position of the governor.

18. In a governing mechanism, the combination of a regulator, a means for actuating it, a shaft for moving said means, a governor, a rod attached to the shaft at one end for moving it endwise and which travels in the path of a cone, a support for the end of the rod located eccentric to the axis of the shaft and forming the apex of the conical path, a connection between the support and governor, and a lock which permits the governor to move the connection and rod but opposes their tendency to move the governor.

19. In a governing mechanism, the combination of a regulator-actuating block having a side slot, a pivoted landing device mounted in the slot, a spring for urging the free end of the device in one direction, and a means to which the block is attached.

20. In a governing mechanism, the combination of a regulator-actuating block having side slots, pivoted landing devices mounted in the slots, springs which press the free ends of the landing devices in one direction, a means which prevents the devices from slipping out of the slots, and a means to which the block is attached.

21. In a governing mechanism, the combination of a driven shaft, an eccentric formed integral with the shaft between its ends, collars fast on the eccentric, dogs mounted on the eccentric between the collars, regulators which are actuated by the dogs, and a governor for controlling the action of the dogs on the regulators.

In witness whereof, I have hereunto set my hand this ninth day of April, 1908.

JOHN G. CALLAN.

Witnesses:
  JOHN A. McMANUS, Jr.,
  CHARLES A. BARNARD.